United States Patent
Shoemake

(10) Patent No.: US 8,102,925 B2
(45) Date of Patent: Jan. 24, 2012

(54) LOW PEAK-TO-AVERAGE RATIO PREAMBLE, AND ASSOCIATED METHOD, FOR PACKET RADIO COMMUNICATION SYSTEM

(75) Inventor: Matthew B. Shoemake, Allen, TX (US)

(73) Assignee: QUALCOMM Incorporated, San Diego, CA (US)

( * ) Notice: Subject to any disclaimer, the term of this patent is extended or adjusted under 35 U.S.C. 154(b) by 625 days.

(21) Appl. No.: 11/057,865

(22) Filed: Feb. 14, 2005

(65) Prior Publication Data

US 2005/0195906 A1    Sep. 8, 2005

Related U.S. Application Data

(60) Provisional application No. 60/544,578, filed on Feb. 13, 2004, provisional application No. 60/545,378, filed on Feb. 18, 2004.

(51) Int. Cl.
H04L 27/28 (2006.01)

(52) U.S. Cl. ........................ 375/260; 375/285

(58) Field of Classification Search .................. 375/259, 375/260
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 7,453,793 | B1 * | 11/2008 | Jones et al. | 370/203 |
| 2002/0154678 | A1 * | 10/2002 | Doetsch et al. | 375/130 |
| 2002/0173282 | A1 * | 11/2002 | Panasik et al. | 455/130 |
| 2004/0109405 | A1 * | 6/2004 | Suh et al. | 370/208 |
| 2004/0136464 | A1 * | 7/2004 | Suh et al. | 375/260 |
| 2004/0151109 | A1 * | 8/2004 | Batra et al. | 370/208 |
| 2004/0208253 | A1 * | 10/2004 | Joo | 375/260 |
| 2005/0036481 | A1 * | 2/2005 | Chayat et al. | 370/351 |
| 2005/0105505 | A1 * | 5/2005 | Fishler et al. | 370/349 |
| 2005/0147022 | A1 * | 7/2005 | Hosur et al. | 370/203 |

OTHER PUBLICATIONS

IEEE 802.15.3, "Part 15.3: Wireless Medium Access Control (MAC) and Physical Layer (PHY) Specifications for High Rate Wireless Personal Area Networks (WPANs)," IEEE Computer Society, 2003.

* cited by examiner

*Primary Examiner* — Khanh C Tran
*Assistant Examiner* — David Huang
(74) *Attorney, Agent, or Firm* — Nicholas J. Pauley; Peter M. Kamarchik; Joanathan T. Velasco

(57) ABSTRACT

Apparatus, and an associated method, for facilitating communications is a packet radio communication system, such as an IEEE 802.15.3a-compliant communication system. A deterministic sequence is used as a channel estimation sequence. The channel estimation sequence exhibits a peak-to-average ratio of lower than 8.86 dB.

37 Claims, 14 Drawing Sheets

| | | | | | | | | | | | | | | | | | | | | | | | | | | | |
|---|---|---|---|---|---|---|---|---|---|---|---|---|---|---|---|---|---|---|---|---|---|---|---|---|---|---|---|
|42|-1|1|-1|-1|1|1|-1|-1|-1|-1|1|-1|-1|1|-1|-1|-1|-1|1|1|1|1|1|-1|1|1|-1|-1|-1|
|43|1|-1|-1|-1|-1|1|1|1|-1|1|-1|-1|-1|1|1|-1|1|-1|-1|1|1|1|-1|1|-1|1|-1|-1|-1|
|44|1|-1|-1|1|1|-1|1|1|1|-1|1|1|-1|1|-1|-1|-1|1|-1|1|1|-1|1|-1|1|1|-1|-1|1|
|45|-1|1|1|-1|1|-1|1|1|1|-1|-1|1|1|-1|1|-1|-1|1|-1|1|1|1|1|-1|-1|-1|1|
|46|-1|1|-1|-1|-1|1|-1|1|-1|1|1|-1|1|1|1|-1|-1|1|1|-1|1|-1|1|1|-1|1|
|47|-1|1|1|-1|1|-1|1|-1|1|1|1|1|-1|1|1|1|1|-1|-1|-1|1|1|-1|-1|-1|-1|1|-1|
|48|1|-1|-1|-1|-1|1|-1|-1|-1|-1|-1|-1|-1|-1|-1|1|1|-1|1|1|1|-1|1|1|1|-1|-1|-1|
|49|-1|-1|1|1|-1|-1|-1|-1|1|1|-1|-1|1|-1|-1|-1|-1|1|-1|1|1|1|-1|-1|1|-1|1|-1|-1|
|50|-1|1|1|-1|-1|-1|-1|-1|1|1|1|-1|1|1|1|-1|1|-1|-1|1|1|-1|-1|-1|-1|1|1|-1|-1|
|51|1|1|-1|-1|1|-1|1|-1|-1|1|1|1|-1|1|-1|-1|-1|1|-1|-1|-1|1|-1|1|-1|1|-1|-1|-1|
|52|-1|1|-1|-1|1|-1|-1|-1|-1|-1|1|1|-1|-1|-1|1|1|1|1|-1|-1|1|1|-1|1|1|1|1|-1|
|53|1|-1|1|-1|-1|1|1|-1|1|1|1|1|-1|-1|1|-1|-1|-1|-1|1|1|1|-1|1|-1|-1|1|-1|-1|
|54|-1|-1|-1|-1|1|-1|-1|-1|-1|-1|1|-1|1|-1|-1|1|-1|-1|1|1|1|1|-1|1|-1|-1|-1|-1|
|55|1|-1|-1|1|1|-1|1|1|1|1|-1|1|1|-1|1|-1|-1|-1|1|-1|1|-1|1|-1|-1|1|-1|1|1|
|56|1|-1|-1|-1|-1|-1|-1|-1|-1|-1|-1|1|-1|-1|-1|-1|1|-1|-1|1|1|1|1|-1|-1|1|1|-1|-1|
|57|-1|1|-1|-1|-1|1|1|1|-1|-1|1|-1|1|-1|1|1|1|-1|1|1|1|-1|-1|1|-1|1|1|
|58|1|-1|-1|-1|1|1|-1|1|-1|-1|-1|-1|-1|1|-1|1|-1|-1|1|1|1|-1|-1|-1|-1|-1|
|59|1|1|1|-1|-1|1|-1|1|-1|1|1|-1|-1|1|-1|-1|1|1|1|1|-1|-1|1|1|-1|-1|
|60|-1|-1|-1|-1|1|1|-1|1|-1|-1|1|-1|1|-1|-1|1|-1|1|-1|1|-1|1|1|-1|1|-1|-1|
|61|1|-1|1|1|-1|1|-1|1|1|-1|-1|1|-1|1|1|-1|1|1|-1|1|-1|-1|-1|1|-1|1|-1|

|    | | | | | | | | | | | | | | | | | | | | | | | | | | | | | |
|----|---|---|---|---|---|---|---|---|---|---|---|---|---|---|---|---|---|---|---|---|---|---|---|---|---|---|---|---|---|---|
| 47 | -1 | 1 | -1 | -1 | -1 | -1 | -1 | 1 | 1 | 1 | 1 | -1 | 1 | 1 | 1 | 1 | -1 | 1 | -1 | 1 | -1 | 1 | -1 | -1 | 1 | -1 | 1 | 1 | 1 | -1 |
| 48 | 1 | 1 | -1 | -1 | -1 | -1 | 1 | 1 | 1 | 1 | 1 | 1 | 1 | -1 | 1 | -1 | 1 | 1 | -1 | 1 | -1 | 1 | -1 | 1 | 1 | 1 | -1 | 1 | -1 |
| 49 | 1 | -1 | 1 | 1 | -1 | 1 | -1 | 1 | -1 | -1 | -1 | -1 | 1 | 1 | 1 | -1 | 1 | -1 | 1 | 1 | -1 | -1 | 1 | 1 | -1 | 1 | -1 | -1 | -1 | 1 |
| 50 | 1 | 1 | 1 | -1 | 1 | -1 | -1 | -1 | -1 | 1 | 1 | 1 | -1 | -1 | 1 | 1 | 1 | -1 | -1 | 1 | -1 | -1 | 1 | 1 | 1 | 1 | 1 | 1 | -1 | 1 |
| 51 | 1 | -1 | 1 | 1 | -1 | 1 | 1 | -1 | 1 | 1 | 1 | 1 | -1 | 1 | 1 | -1 | 1 | 1 | -1 | -1 | 1 | 1 | 1 | 1 | -1 | 1 | 1 | -1 | 1 |
| 52 | -1 | 1 | -1 | 1 | 1 | 1 | -1 | -1 | 1 | 1 | 1 | 1 | -1 | -1 | 1 | 1 | -1 | -1 | -1 | -1 | 1 | 1 | 1 | 1 | -1 | -1 | 1 | -1 |
| 53 | 1 | -1 | 1 | 1 | -1 | 1 | 1 | -1 | 1 | 1 | -1 | 1 | 1 | -1 | 1 | -1 | -1 | 1 | -1 | -1 | -1 | -1 | 1 | 1 | 1 | -1 | 1 | 1 |
| 54 | -1 | -1 | 1 | -1 | 1 | 1 | -1 | -1 | 1 | 1 | -1 | -1 | -1 | 1 | -1 | 1 | -1 | -1 | 1 | -1 | -1 | -1 | -1 | 1 | 1 | 1 | 1 | -1 |
| 55 | -1 | -1 | 1 | 1 | 1 | 1 | 1 | 1 | -1 | -1 | 1 | 1 | 1 | -1 | 1 | -1 | -1 | 1 | 1 | -1 | -1 | 1 | -1 | -1 | -1 | 1 | -1 |
| 56 | -1 | -1 | -1 | -1 | 1 | 1 | -1 | 1 | -1 | -1 | 1 | -1 | 1 | -1 | 1 | -1 | 1 | -1 | -1 | -1 | 1 | -1 | -1 | -1 | -1 | -1 | -1 | 1 |

Tones(-61:-1 1:61) = {-1 -1 -1 1 -1 -1 1 1 1 1 -1 -1 1 1
-1 -1 1 -1 1 1 1 -1 -1 -1 -1 1 1 1 1 1
1 1 1 -1 -1 1 1 -1 -1 1 -1 1 -1 -1 1 1
1 1 1 -1 -1 -1 -1 1 1 1 1 -1 -1 1 -1 -1 1 1
1 1 -1 1 -1 1 -1 1 1 1 1 1 1 -1 -1 1 -1
1 -1 1 -1 1 1 1 1 1 1 -1 -1 -1 1 1 -1 -1 -1
1 1 -1 -1 1 -1 -1 1 1 1 1 1 1 -1 1 -1 -1 -1
1 1 1 1 1 1 -1 1 -1 -1 -1 1 -1 -1 -1 -1 -1 -1 -1}

Tones(1:61) = 1/sqrt(2)*{(1+j) (1+j) (1+j) (-1-j) (-1-j)
(-1-j) (-1-j) (1+j) (1+j) (-1-j) (1+j) (-1-j)
(1+j) (-1-j) (1+j) (-1-j) (1+j) (-1-j) (-1-j)
(1+j) (-1-j) (1+j) (-1-j) (1+j) (-1-j) (1+j)
(-1-j) (-1-j) (-1-j) (1+j) (1+j) (-1-j) (-1-j)
(1+j) (-1-j) (-1-j)(-1-j) (1+j) (-1-j) (-1-j)
(1+j) (1+j) (-1-j) (1+j) (1+j) (1+j) (1+j)
(-1-j) (-1-j) (1+j) (1+j) (1+j)}

```
PAR: 3.501167 dB
-1 -1 -1  1 -1  1  1  1 -1  1  1  1 -1  1  1 -1 -1  1 -1 -1 -1  1 -1 -1 -1  1 -1  1  1  1 -1 -1 -1  1  1
-1  1  1  1 -1  1  1  1 -1 -1 -1 -1  1 -1 -1  1  1  1  1  1 -1 -1  1  1 -1  1 -1  1 -1  1 -1 -1
 1  1 -1  1  1  1  1 -1  1  1  1  1  1 -1  1  1  1  1 -1  1  1 -1  1 -1 -1 -1 -1 -1  1 -1
 1  1 -1 -1 -1 -1  1  1  1 -1 -1  1 -1 -1  1 -1  1 -1  1  1  1 -1 -1 -1 -1  1 -1  1
-1 -1

PAR: 3.436866 dB
-1 -1 -1  1 -1  1  1  1 -1  1  1  1 -1  1  1 -1 -1  1 -1 -1 -1  1 -1 -1 -1  1 -1  1  1  1 -1 -1 -1  1  1
 1  1  1  1 -1  1  1  1 -1 -1 -1 -1  1 -1 -1  1  1  1  1  1 -1 -1 -1  1 -1  1 -1  1 -1  1 -1 -1
 1  1 -1  1  1  1  1 -1  1  1  1  1  1 -1  1  1  1  1 -1  1  1 -1  1 -1 -1 -1 -1 -1  1 -1
 1  1 -1 -1 -1 -1  1  1  1 -1 -1  1 -1 -1 -1 -1  1  1  1  1  1 -1 -1 -1 -1  1 -1  1
-1 -1

PAR: 3.788669 dB
-1 -1 -1  1 -1  1  1  1 -1  1  1  1 -1  1  1 -1 -1  1 -1 -1 -1  1 -1 -1 -1  1 -1  1  1  1 -1 -1 -1  1  1
-1  1  1  1 -1  1  1  1 -1 -1 -1 -1  1 -1 -1  1  1  1  1  1 -1 -1 -1  1 -1  1 -1  1 -1  1 -1 -1
 1  1 -1  1  1  1  1 -1  1  1  1  1  1 -1  1  1  1  1 -1  1  1 -1  1 -1 -1 -1 -1 -1  1 -1
 1  1 -1 -1 -1 -1  1  1  1 -1 -1  1 -1 -1 -1 -1  1  1  1  1  1 -1 -1 -1 -1  1 -1  1
-1 -1

PAR: 3.578115 dB
-1 -1 -1  1 -1  1  1  1 -1  1  1  1 -1  1  1 -1 -1  1 -1 -1 -1  1 -1 -1 -1  1 -1  1  1  1 -1 -1 -1  1  1
-1  1  1  1  1  1  1  1 -1 -1 -1 -1  1 -1 -1  1  1  1  1  1 -1 -1 -1  1 -1  1 -1  1 -1  1 -1 -1
 1  1 -1 -1  1  1  1 -1  1  1  1  1  1 -1  1  1  1  1 -1  1  1 -1  1 -1 -1 -1 -1 -1  1 -1
 1  1 -1 -1 -1 -1  1  1  1 -1 -1  1 -1 -1 -1 -1  1  1  1  1  1 -1 -1 -1 -1  1 -1  1
-1 -1

PAR: 3.624846 dB
-1 -1 -1  1 -1  1  1  1 -1  1  1  1 -1  1  1 -1 -1  1 -1 -1 -1  1 -1 -1 -1  1 -1  1  1  1 -1 -1 -1  1  1
-1  1  1  1 -1  1  1  1 -1 -1 -1 -1  1 -1 -1  1  1  1  1  1 -1 -1 -1  1 -1  1 -1  1 -1  1 -1 -1
 1  1 -1  1  1  1  1 -1  1  1  1  1  1 -1  1  1  1  1 -1  1  1 -1  1 -1 -1 -1 -1 -1  1 -1
 1  1 -1 -1 -1 -1  1  1  1 -1 -1 -1  1 -1 -1 -1 -1  1  1  1  1  1 -1 -1 -1 -1  1 -1  1
-1 -1

PAR: 3.564532 dB
-1 -1 -1  1 -1  1  1  1 -1  1  1  1 -1  1  1 -1 -1  1 -1 -1 -1  1 -1 -1 -1  1 -1  1  1  1 -1 -1 -1  1  1
-1  1  1  1 -1  1  1  1 -1 -1 -1 -1  1 -1 -1  1  1 -1  1  1 -1 -1 -1  1 -1  1 -1  1 -1  1 -1 -1
 1 -1 -1  1  1  1  1 -1  1  1  1  1  1 -1  1  1  1  1 -1  1  1 -1  1 -1 -1 -1 -1 -1  1 -1
 1  1 -1 -1 -1 -1  1  1  1 -1 -1  1 -1 -1 -1 -1  1  1  1  1  1 -1 -1 -1 -1  1 -1  1
-1 -1

PAR: 3.770792 dB
-1 -1 -1  1 -1  1  1  1 -1  1  1  1 -1  1  1 -1 -1  1 -1 -1 -1  1 -1 -1 -1  1 -1  1  1  1 -1 -1 -1  1  1
-1  1  1  1 -1  1  1  1 -1 -1 -1 -1  1 -1 -1  1  1  1  1  1 -1 -1 -1  1 -1  1 -1  1 -1  1 -1 -1
 1 -1 -1  1  1  1  1 -1  1  1  1  1  1 -1  1  1  1  1 -1  1  1 -1  1 -1 -1 -1 -1 -1  1 -1
 1  1 -1 -1 -1 -1  1  1  1 -1 -1 -1  1 -1 -1 -1 -1  1  1  1  1  1 -1 -1 -1 -1  1 -1  1
-1 -1

PAR: 3.717067 dB
-1 -1 -1  1 -1  1  1  1 -1  1  1  1 -1  1  1 -1 -1  1 -1 -1 -1  1 -1 -1 -1  1 -1  1  1  1 -1 -1 -1  1  1
-1  1  1  1 -1  1  1  1 -1 -1 -1 -1  1 -1 -1  1  1 -1  1 -1 -1 -1 -1  1 -1  1 -1  1 -1  1 -1 -1
 1  1 -1  1  1 -1  1 -1  1  1  1  1  1 -1  1  1  1  1 -1  1  1 -1  1 -1 -1 -1 -1 -1  1 -1
 1  1 -1 -1 -1 -1  1  1  1 -1 -1  1 -1 -1 -1 -1  1 -1  1 -1  1  1 -1 -1 -1 -1  1 -1 -1
-1 -1

PAR: 3.822487 dB
-1 -1 -1  1 -1  1  1  1 -1  1  1  1 -1  1  1 -1 -1  1 -1 -1 -1  1 -1 -1 -1  1 -1  1  1  1 -1 -1 -1  1  1
-1  1  1  1 -1  1  1  1 -1 -1 -1 -1  1 -1 -1  1  1  1  1  1 -1 -1 -1  1 -1  1 -1  1 -1  1 -1 -1
 1  1 -1  1  1  1  1 -1  1  1  1  1  1 -1  1  1  1  1 -1  1  1 -1  1 -1 -1 -1 -1 -1  1 -1
 1  1 -1 -1 -1 -1  1  1  1 -1 -1  1 -1 -1 -1 -1  1  1  1  1  1 -1 -1 -1 -1  1 -1  1
-1 -1
```

FIG. 10

LOW PEAK-TO-AVERAGE RATIO PREAMBLE, AND ASSOCIATED METHOD, FOR PACKET RADIO COMMUNICATION SYSTEM

CROSS-REFERENCE TO RELATED APPLICATIONS

The present invention claims the priority of provisional patent application No. 60/544,578, filed on 13 Feb. 2004 and upon provisional patent application No. 60/545,378, filed on 18 Feb. 2004. The contents of both of such references are incorporated herein by their entirety.

The present invention relates generally to the communication of data in a packet radio communication system, such as a multi-band OFDM (Orthogonal Frequency Division Multiplexing) UWB (Ultra Wide Band) communication system operable in general conformity with the operating protocols of the IEEE 802.15.3a operating specification. More particularly, the present relates to a manner by which to form a deterministic sequence for use, e.g., as a channel estimation sequence.

The deterministic sequence is formed of a selected number of values. The values define tones that exhibit peak-to-average ratios (PARs) that are better than those conventionally proposed to be used. Use of a channel estimation sequence of an improved PAR reduces the possibility that the values of the sequence shall be clipped by communication system circuitry, such as a digital-to-analog and analog-to-digital conversion circuitry at the sending and receiving stations.

BACKGROUND OF THE INVENTION

Packet communication systems and their use through which to communicate have become pervasive in modern society. A packet communication system, similar to other types of communication systems, provides for the communication of data between communication stations of a set of communication stations. The set includes at least a sending station and a receiving station. Data originated at, or otherwise provided to, a sending station is caused to be communicated by the sending station for delivery at a receiving station. The data sent by the sending station is sent upon a communication channel, and the receiving station monitors the communication channel, thereby to detect delivery of the data communicated thereon.

In a packet communication system, data that is communicated is first packetized into packets of data, and the data packets, once formed, are then communicated, sometimes at discrete intervals. Once delivered to a receiving station, the information content of the data is ascertained by concatenating the information parts of the packets together. Packet communication systems generally make efficient use of communication channels as the communication channels need only to be allocated pursuant to a particular communication session only for the period during which the data packets are communicated. Packet communication channels are sometimes, therefore, shared communication channels that are shared by separate sets of communication stations between which separate communication services are concurrently effectuated.

Operating specifications that define the operating protocols of various types of packet radio communication systems have been promulgated and yet others are undergoing development and standardization. A packet radio communication system provides the advantages of a radio communication system in that the communication stations that are parties to a communication session need not be interconnected by electrically-conductive connectors. Instead, the communication channels of a packet radio communication system are formed of radio channels, defined upon a portion of the electromagnetic spectrum.

While packet radio communication systems have been developed for the effectuation of various different types of communication services, much recent interest has been directed towards the development of packet radio communication systems capable of providing for data-intensive communication services. For instance, the IEEE 802.15.3a operating specification contemplates an OFDM (Orthogonal Frequency Division Multiplexed) UWB (Ultra Wide Band) communication system, capable of communicating data over wide bandwidths over short ranges.

A structured data format is set forth in the present promulgation of the operating specification. The data format of a data packet formed in conformity with the IEEE 802.1 5.3a includes a preamble part and a payload part. Other packet communication systems analogously generally format data into packets that also include a preamble part and a payload part. The payload part of the packet contains the information that is to be communicated. That is to say, the payload part is nondeterminative. Conversely, the preamble part of the data packet does not contain the informational content that is to be communicated but, rather, includes determinative data that is used for other purposes. And, in particular, the preamble part of an IEEE 802.15.3a packet preamble includes three parts, a packet sync sequence, a frame sync sequence, and a channel estimation sequence. The packet sync sequence is of a length of twenty-one OFDM (symbols): the frame sync sequence is of a length of three OFDM symbols, and the channel estimation sequence is of a length of six OFDM symbols. And, collectively, the sequences are of a time length of 9,375 microseconds.

The preamble portions are used, for instance, to facilitate synchronization between the sending and receiving stations that send and receive the data packet, respectively. Additionally, the preamble is used for purposes of automatic gain control (AGC). For use of automatic gain control, a receiving station is able to set its gain at an appropriate level, e.g., to facilitate application of received data to an analog-to-digital converter to supply useful bits to a baseband part of the receiving station. The preamble is further used for purposes of packet detection. Packet detection identifies to the receiving station the reception at the receiving station of the packet. Upon detection of the packet, e.g., various state machines at the receiving station are started to enable processing of the incoming packet. And, of particular significance herein, the preamble also is used for channel estimation. The radio channel upon which the packet is communicated undergoes reflections and is otherwise distorted during its communication to the receiving station. To receive the transmitted data correctly, the receiving station must be provided with a good estimate of the channel to permit proper compensation to be made of the channel.

The sequences of which the preamble is formed preferably exhibit good peak-to-average ratios to ensure best that the sequences are not truncated, i.e., clipped when passed through sending and receiving station circuitry. While existing proposals for values of such sequences have been set forth, if a manner could be provided by which to identify and use sequences that exhibit improved peak-to-average ratios, improved communication system performance would be possible.

It is in light of this background information related to communications in a packet communication system that the significant improvements of the present invention have evolved.

SUMMARY OF THE INVENTION

The present invention, accordingly, advantageously provides apparatus, and an associated method, for communicating data in a packet radio communication system, such as a multi-band OFDM (Orthogonal Frequency Division Multiplexing) UWB (Ultra Wide Band) communication system operable in general conformity with-operating protocols of the IEEE 802.15.3a operating specification.

Through operation of an embodiment of the present invention, a manner is provided by which to form a deterministic sequence for use as a channel estimation sequence of a preamble of an IEEE 802.15.3a packet.

The deterministic sequence is formed of a selected number of values. The values define tones that exhibit peak-to-average ratios that are better than those conventionally proposed to be used. Use of a channel estimation sequence of an improved peak-to-average ratio reduces the likelihood that the values of the sequence shall be clipped by communication system circuitry, such as a digital-to-analog converter and an analog-to-digital converter forming part of sending and receiving stations between which data is communicated.

The deterministic sequence exhibits peak-to-average ratios better than 8.86 dB, the existing peak-to-average ratio of a channel estimation sequence proposed by the multiband OFDM alliance for inclusion in the IEEE 802.15.3a operating specification. The improved peak-to-average ratios that are provided reduces the possibility of occurrence of clipping when the sequences are passed through circuitry of a sending and receiving stations. The sequence is thereby less likely to be distorted in a manner that prevents its use once received at a receiving station.

Existing manners are known by which to form complementary sequences, and complementary sequences, thus formed, are known to generate low peak-to-average ratio signals in a time domain, e.g., Golay sequences. Such existing sequences, however, are difficult to analyze when used in actual operating systems, such as an OFDM system constructed to be inconformity with the IEEE 802.15.3a operating specification. A sequence of an embodiment of the present invention is, conversely, also more easily analyzed and detectable when received at a receiving station subsequent to communication upon a radio air interface extending between a sending station from which the sequence is communicated and the receiving station that receives the sequence.

In the exemplary embodiment, a deterministic sequence is generated and used to populate a preamble part of a packet that is formatted in conformity with the data structure set forth in an IEEE 802.15.3a operating specification. In communication systems that utilize other formatting schemes and operate in conformity with other operating specifications, the deterministic sequence is analogously utilizable therein. The sequence, when used in the communication system operable in general conformity with the IEEE 802.15.3a operating specification, the sequence is used as a channel estimation sequence. The channel estimation sequence forms a field of the preamble following a packet sync sequence and a frame sync sequence of the preamble part. The channel estimation sequence is of a length of six OFDM symbols. The channel estimation sequence thereby forms part of the preamble part of the packet that prepends the payload part of the data structure.

In the OFDM system operable in conformity with the 802.15.3a operating specification, the values of the channel estimation sequence define tones, and different ones of the tones are communicated upon different ones of the sub-carriers defined in the communication system. In one embodiment, the OFDM system has 128 tones, and the channel estimation sequence is formed of 122 energy-containing tones. DC (Direct Current) components and components forming tones at the edge of a band at the upper ends of the bands, are nonenergy containing, and the remaining 122 tones defined by the channel estimation sequence are energy-containing, sent on the different ones of the subcarriers of the OFDM radio air interface.

In a further embodiment, the signal defined by the channel estimation sequence forms a real valued signal, i.e., a signal in which all of the time domain samples thereof are real. A real-valued signal formed of a deterministic sequence of an embodiment of the present invention is formed of values in which negative tones in frequency are conjugates of the positive tones in frequency. When the sequence is formed of 122 tones, the 61 negative tones are conjugates of the 61 positive tones.

In another embodiment, the deterministic sequence is formed of 112 tones. Again, the signal formed of the tones does not include energy-containing components at the DC level and at the edges of the band. When the signal defined by the sequence forms a real valued signal in which all of the transmitted time domain samples are real, the sequence is formed of 56 negative-valued tones and 56 positive-valued tones in which the negative-values tones are conjugates of the corresponding positive-valued tones.

In another embodiment of the present invention, the sequences are selected by sampling signals in which the signals are sampled at a rate greater than the Nyquist rate. That is to say, the signal is oversampled, and the sequence is formed thereform. Sequences are selected for use as channel estimation sequences that exhibit peak-to-average ratios of less than 8.86 dB. In one embodiment, the sequence is stored at a memory location, and the sequence is retrieved when a data structure is formed. The retrieved sequence is used to populate the channel estimation sequence part of the preamble of the data structure.

Because of the improved peak-to-average ratio characteristics of the sequence, clipping of the signal so-formed is less likely to occur during communication operations at the sending and receiving stations. Channel estimation at a receiving station is improved. As a result of the improved channel estimation, the receiving station is better able to identify correctly the informational content of the payload part of the data structure.

In these and other aspects, therefore, apparatus, and an associated method, is provided for a communication station. The communication station is operable to communicate an information data sequence. A deterministic sequence generator generates a deterministic sequence. The deterministic sequence is to be prepended to the information data sequence. The deterministic sequence is of a selected sequence length, and the deterministic sequence exhibits a peak-to-average ratio less than 8.86 dB.

A more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

FIG. 4 illustrates a table that lists thirty deterministic sequences used as channel estimation sequences pursuant to an embodiment of the present invention.

FIG. 5 illustrates a table, analogous to the table shown in FIG. 4, but of thirty other deterministic sequences, also utilizable as channel estimation sequences pursuant to operation of an embodiment of the present invention.

FIG. 6 illustrates a table, analogous to those shown in FIGS. 4-5, but of additional deterministic sequences utilizable as channel estimation sequences pursuant to an embodiment of the present invention.

FIG. 7 illustrates another table, analogous to those shown in FIGS. 4-6, but of other sequences utilizable pursuant to an embodiment of the present invention as channel estimation sequences.

FIG. 8 illustrates another sequence of tones of an embodiment of the present invention utilizable as a channel estimation sequence.

FIG. 9 illustrates-another sequence of an embodiment of the present invention, also utilizable as a channel estimation sequence.

FIG. 10 illustrates a table listing additional deterministic sequences that form channel estimation sequences utilizable pursuant to an embodiment of the present invention.

DETAILED DESCRIPTION

Figure 1:
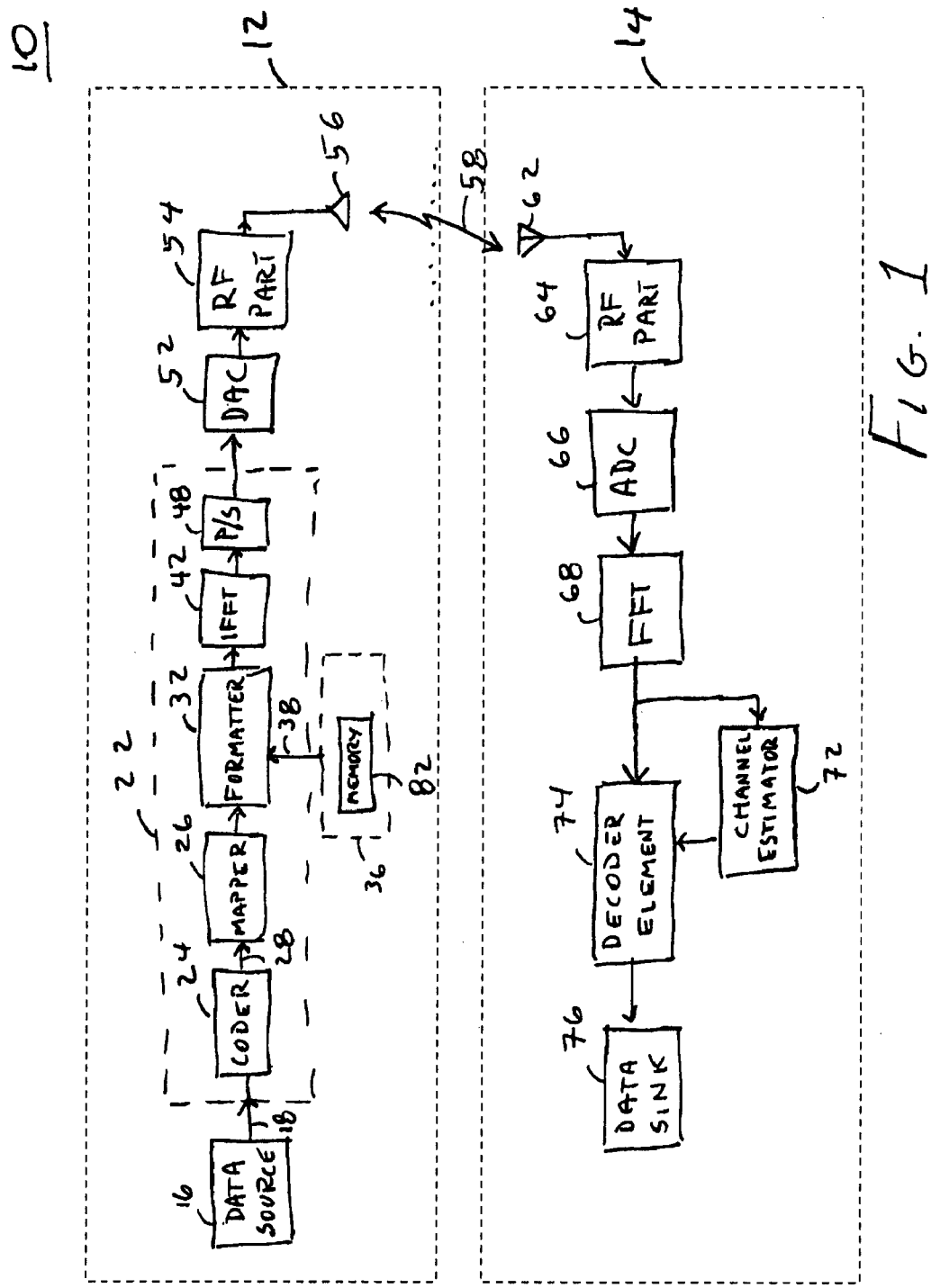
FIG. 1 illustrates a radio communication system in which an embodiment of the present invention is operable.

Referring first to FIG. 1, a communication system, shown generally at 10, provides for packet radio communications between a set of communication stations. Here, two communication stations, communication stations 12 and 14, are shown. In the exemplary embodiment, the communication system forms a two-way communication system in which the communication stations operable therein are each capable of both sending and receiving data. For purposes of explanation of operation, the communication station 12 shall be referred to as the sending station, and the communication station 14 shall be referred to as the receiving station. Operation shall be described with respect to the communication of data by the communication station 12 for reception by the communication station 14. Operation of the communication stations in which data is sent by the communication station 14 to be received by the communication station 12 is analogous.

Additionally, while the communication system is representative of any of various packet, and other, radio communication systems, in the exemplary embodiment, the communication systems forms an ultra wide band (UWB) OFDM (Orthogonal Frequency Division Multiplexing) communication system that provides for high data rate communications over short distances. The communication system is operable in general conformity with a variant of an IEEE 802 operating specification that pertains to UWB OFDM communications, such as the IEEE 802.15.3a operating specification.

Additionally, while operation of an embodiment of the present invention has particular applicability to communications in such an UWB OFDM communication system that operates in conformity with the IEEE 802.15.3a operating specification, or a variant thereof, an embodiment of the present invention also has applicability in other types of communication systems in which deterministic sequences are used. Accordingly, the following description is exemplary only, and the teachings of the present invention can analogously be described with respect to communications in another type of communication system.

Data sent by the sending station 12 is originated at a data source 16. The data source 16 is representative of a data source embodied physically together with other structure of the sending station as well as a data source that is positioned remote from the other structure of the sending station. The data source generates digital bits on the line 18 that are provided to a coding element 22. The coding element 22 is also functionally represented and includes functional entities, implementable in any desired manner, such as by ASIC implementation or by algorithms executable by processing circuitry.

The coding element 22 is here shown to include a coder 24, such as a convolutional coder that forms coded representations of the input data bits provided to the coding element. The coded representations, in one embodiment, are further punctured by a puncturing pattern. The coded data is provided to a mapper 26 that maps code words formed by the coder 24 on the lines 28 into data symbols, e.g., QPSK (Quarternary Phase Shift Keying) symbols, 16-QAM symbols, etc. Mapped symbols are formatted by a formatter 32.

The formatter 32 forms data structures that are in conformity with the IEEE 802.15.3a operating specification. As set forth in the operating specification, the data structure forms a packet including a preamble and a payload. Values that populate part of the preamble are formed by the apparatus 36, provided to the formatter by way of the line 38.

Data structures, once formed by the formatter 32, are placed in the time domain by an inverse fast Fourier transformer (IFFT) 42. And, once transformed, the values are placed in serial form by a parallel-to-serial (P/S) converter 48.

Time-domain representations are provided, serially, to a digital-to-analog converter (DAC) 52. The converter converts the data into analog form. And, once converted, the data is provided to an RF (Radio Frequency) part 54 that performs RF operations, such as up-conversion and modulation operations upon the data. The data, once operated upon, is provided to one or more transmit antennas 56. While a single transmit antenna 56 is shown, in a multiple input system, multiple transmit antennas are used, and the antenna 56 is representative of any number of transmit antennas.

The data sent by the sending station is sent upon radio channels of a radio air interface defined in the IEEE 802.15.3a operating specification. As the IEEE 802.15.3a operating specification defines channels upon sub-carriers, the sending station causes the data to be communicated on the different sub-carriers, e.g., 128 sub-carriers that are defined on the radio air interface. The arrows 58 are representative of the sub-carriers upon which the data is communicated by the sending station to the receiving station.

The receiving station 14 includes one or more receive antennas 62. Again, while only a single receive antenna is shown, in an actual implementation, additional receive antennas can be utilized. The receive data, once converted into electrical form by the receive antenna is provided to an RF part 64. The RF part operates in manners analogous to operation of the RF part 54 of the sending station but, at the receiving station operates to demodulate and down-convert the received data.

The received data, once down-converted to baseband levels by the RF part 64, is digitized by an analog-to-digital converted (ADC) 66. The data, once digitized, is transformed into the frequency domain by a fast Fourier transformer (FFT) 68. The data, once transformed, is operated upon, here by a channel estimator 72 and by a decoding element 74. Various functions are performed by the decoding element 74. While not separately shown, mapping and decoding operations, amongst other things, are performed by the decoding element. Operations performed by the decoder element make use of channel estimation made by the channel estimator 72.

As mentioned previously, the formatting is performed at the sending station to form a data structure including a preamble and a payload. The preamble includes a channel estimation sequence that is used by the channel estimator 72 to estimate the channel and to facilitate better operation of the decoder element of the receiving station. Here, the apparatus 36 includes a memory element 82 that stores one or more deterministic sequences used as a channel estimation sequence that populates part of the preamble of a data structure formed by the formatter 32. When a data structure is formed, the sequence is retrieved from the memory element and used to populate the appropriate portion of the preamble of the data structure. When more than one sequence is stored, the apparatus further includes a selector for selecting which sequence to utilize. The sequence is of a peak-to-average ratio of lower than 8.86 dB. Because of the lowered peak-to-average ratio, the possibility of clipping of the sequence by circuitry of the communication stations 12 and 14, such as the converters 52 and 56 of the respective converters, is reduced.

Figure 2:
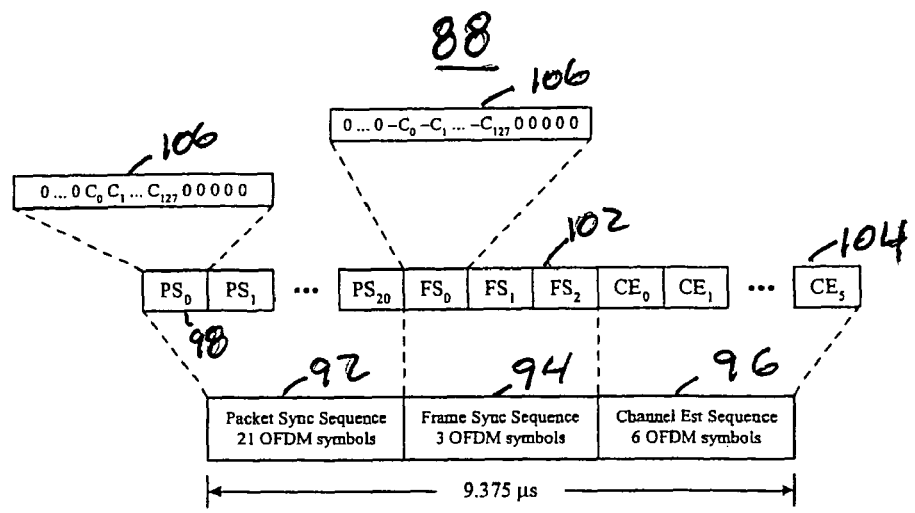
FIG. 2 illustrates a representation of the format of the preamble of a data structure used pursuant to commutation operations of the communication system shown in FIG. 1.

FIG. 2 illustrates portions of the preamble 88 of a data-structure formed by the sending station 12 of the communication system 10 shown in FIG. 1. The parts of the preamble shown in FIG. 2 include a packet sync sequence 92, a frame sync sequence 94, and a channel estimation sequence 96. The sequence 92 is formed of 21 OFDM symbols (PS) 98. The sequence 94 is formed of 3 OFDM symbols (FS) 102. And, the channel estimation sequence 96 is formed of 6 OFDM symbols (CE) 104. Each symbol 98, 102, and 104, in turn, is formed of a plurality of values 106. The parts 92, 94, and 96 of the preamble are of a time length of 9.375 milliseconds. In alternate embodiments in which the communication system operates pursuant to the operating protocols of another operating standard, analogous fields of the preamble of a data structure are formed. Pursuant to an embodiment of the present invention, a deterministic sequence forming a channel estimation sequence is provided by the apparatus 36 (shown in FIG. 1) and used to populate the values forming the channel estimation sequence 96. The payload part of the data structure follows the preamble, and the entire data structure is caused to be communicated across the subcarriers defined upon the radio air interface of the communication system shown in FIG. 1.

Figure 3:
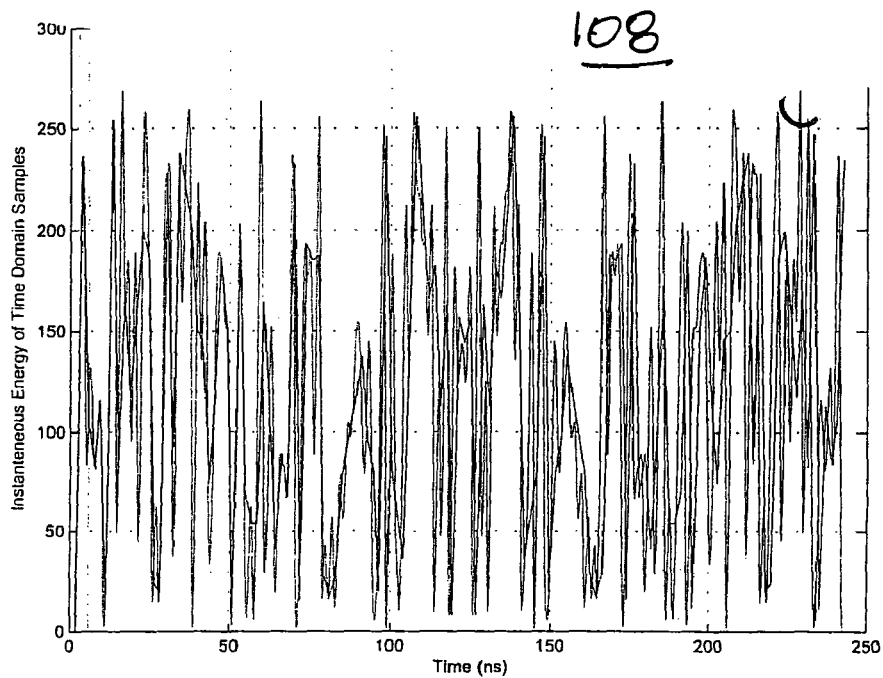
FIG. 3 illustrates an exemplary signal, samples of which are taken to form a deterministic sequence of an embodiment of the present invention.

FIG. 3 illustrates an exemplary signal 108, samples of which are used to form the deterministic sequence that forms the channel estimation sequence populating the channel estimation sequence field of a data structure formed pursuant to operation of the sending station 12, shown in FIG. 1. The signal is sampled at an oversampling factor, e.g., a factor of 1,024, thereby to insure better that the signal from which the sequence is obtained does not exhibit an inappropriately high peak-to-average ratio.

Figure 4A:
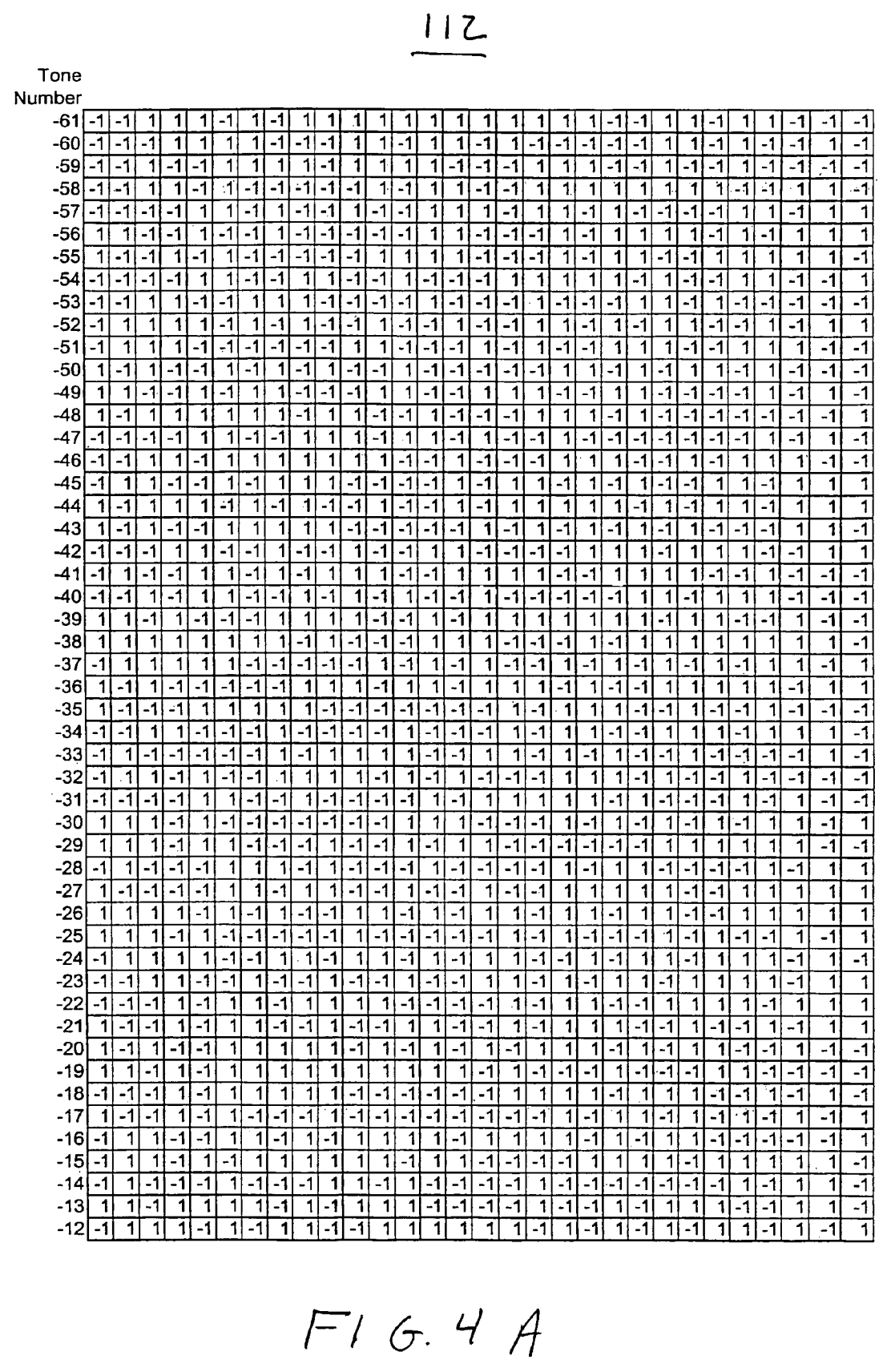
Figure 4B:
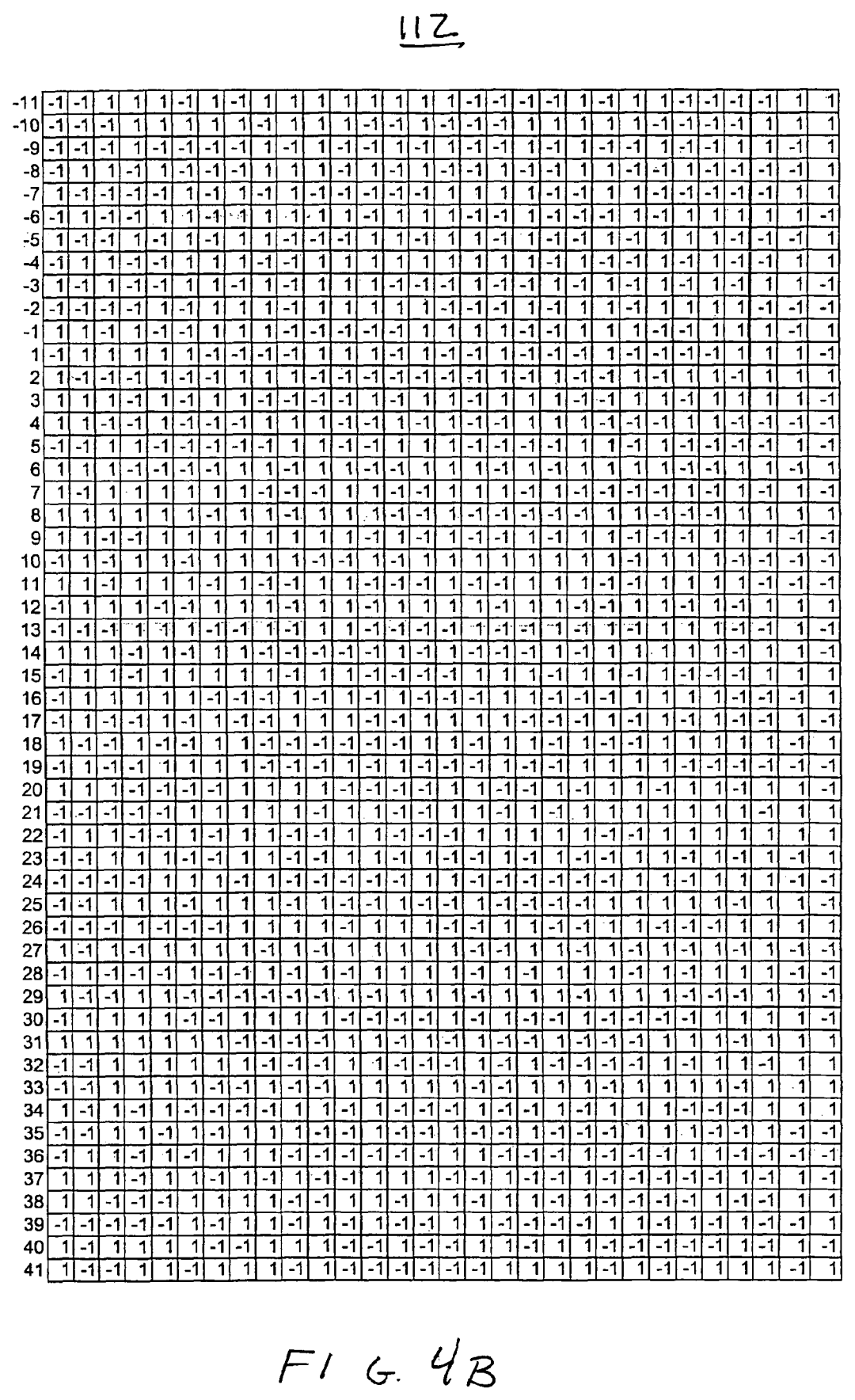

FIGS. 4A, 4B, and 4C illustrate a table 112 of thirty sequences, any of which forms a channel estimation sequence used during operation of the communication system 10 (shown in FIG. 1) pursuant to an embodiment of the present invention. Each column of the table defines a separate sequence, and each sequence is of 122 tones. The tones are identified by tone numbers extending between −61 and 61. Each of the sequences defines a signal that exhibits a peak-to-average ratio of better than 8.86 dB.

Figure 5:
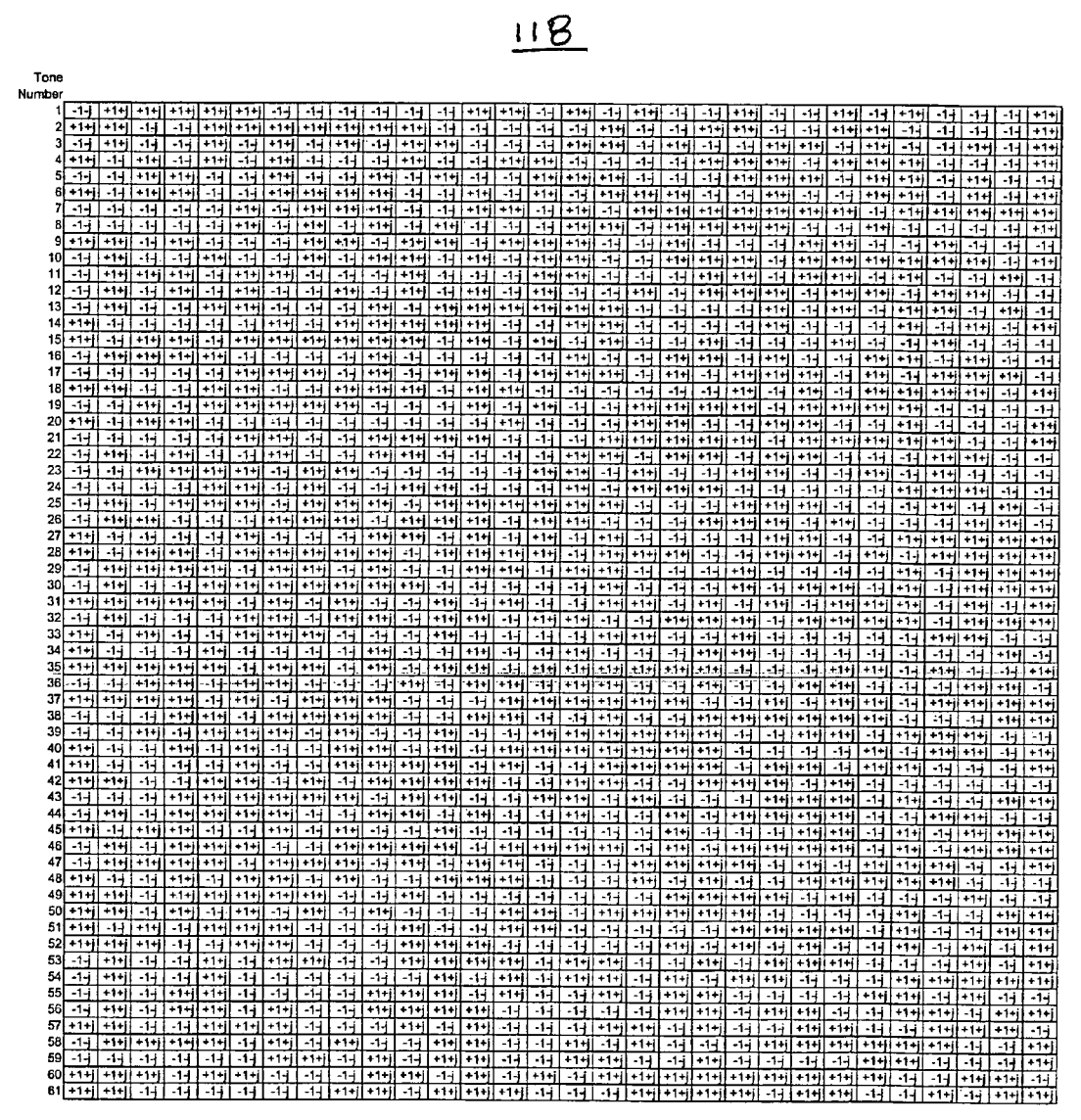

FIG. 5 illustrates another table, table 118, that also lists thirty deterministic sequences, any of which is utilizable to form the channel estimation sequence used during operation of the communication system 10 (shown in FIG. 1). Here, the values forming the different sequences define a real-valued signal in which the negative tones and frequency are conjugates of the positive ones. In the table, only the positive frequencies are shown. That is to say, while 61 tones are shown for each sequence, an actual sequence includes negative frequencies that are complex conjugates of those that are shown. Any of the thirty conjugate symmetric sequences are used to form the channel estimation sequence used by the communication system 10 shown in FIG. 1.

Figure 6A:
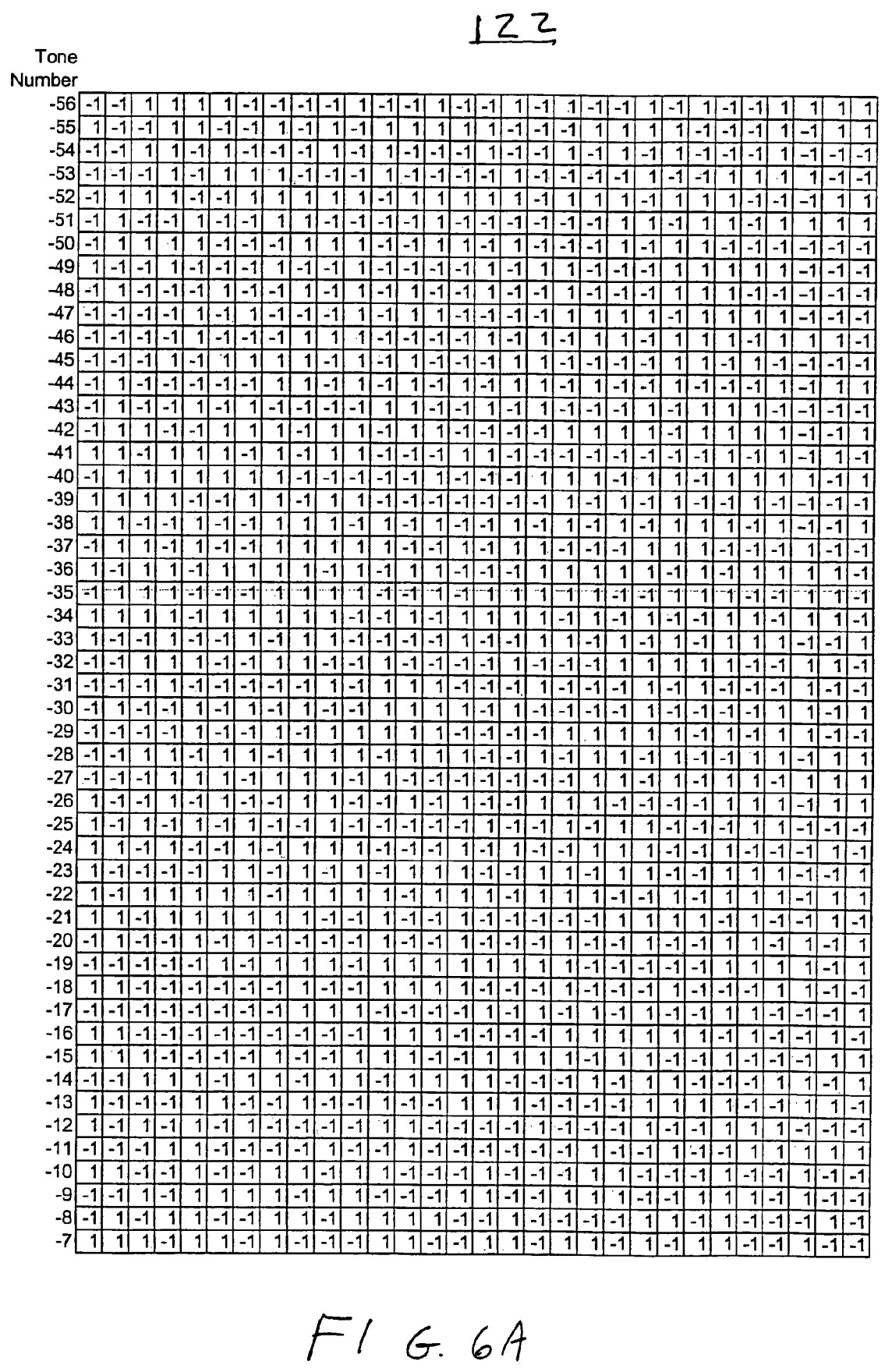
Figure 6B:
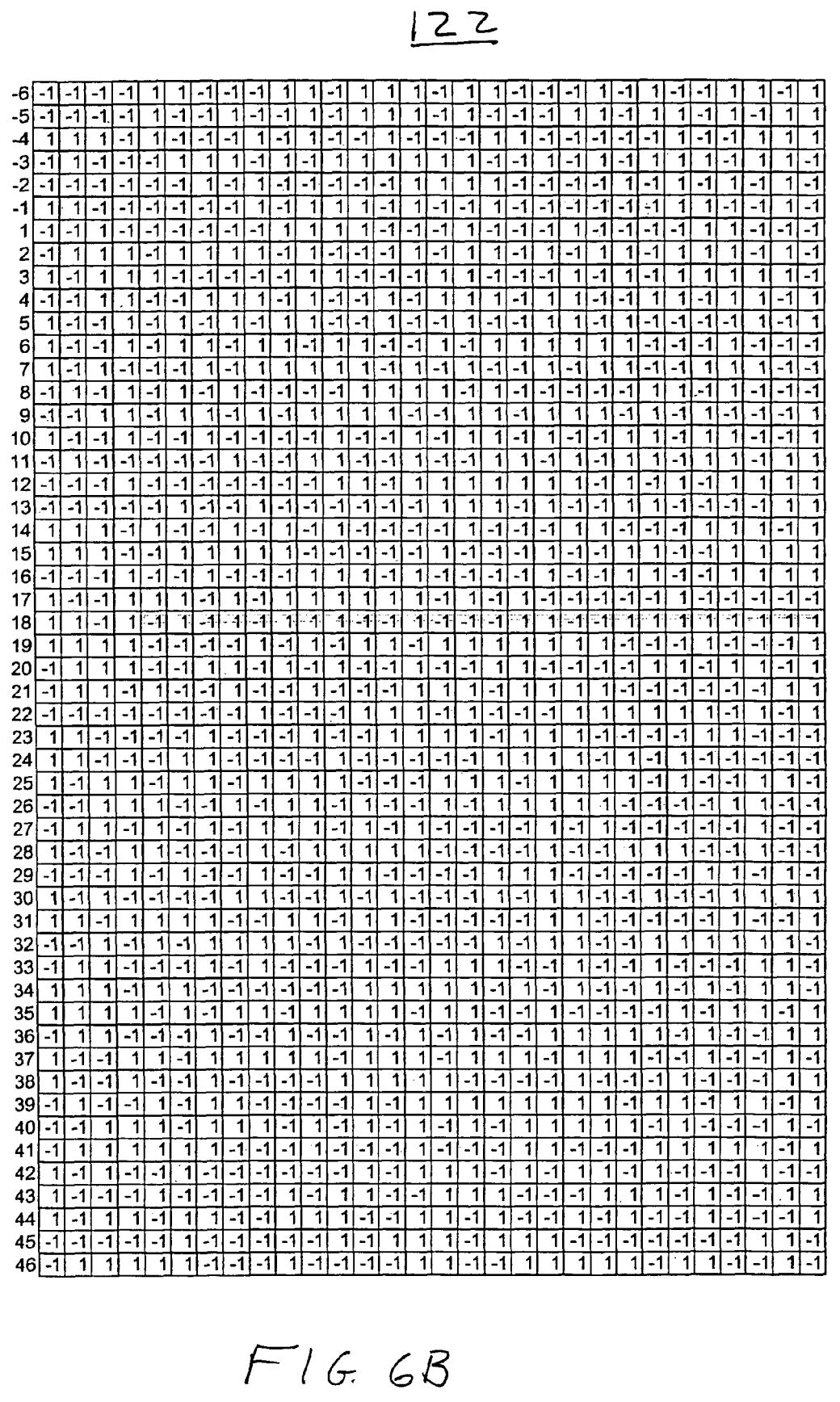

FIG. 6 illustrates a table 122 that also lists thirty separate sequences, any of which is usable to form the channel estimation sequence. Here, again, each column defines a separate sequence, and the sequences are each formed of 112 tones. The tones are identified by tone numbers that, here, extend between −56 and 56.

Figure 7:
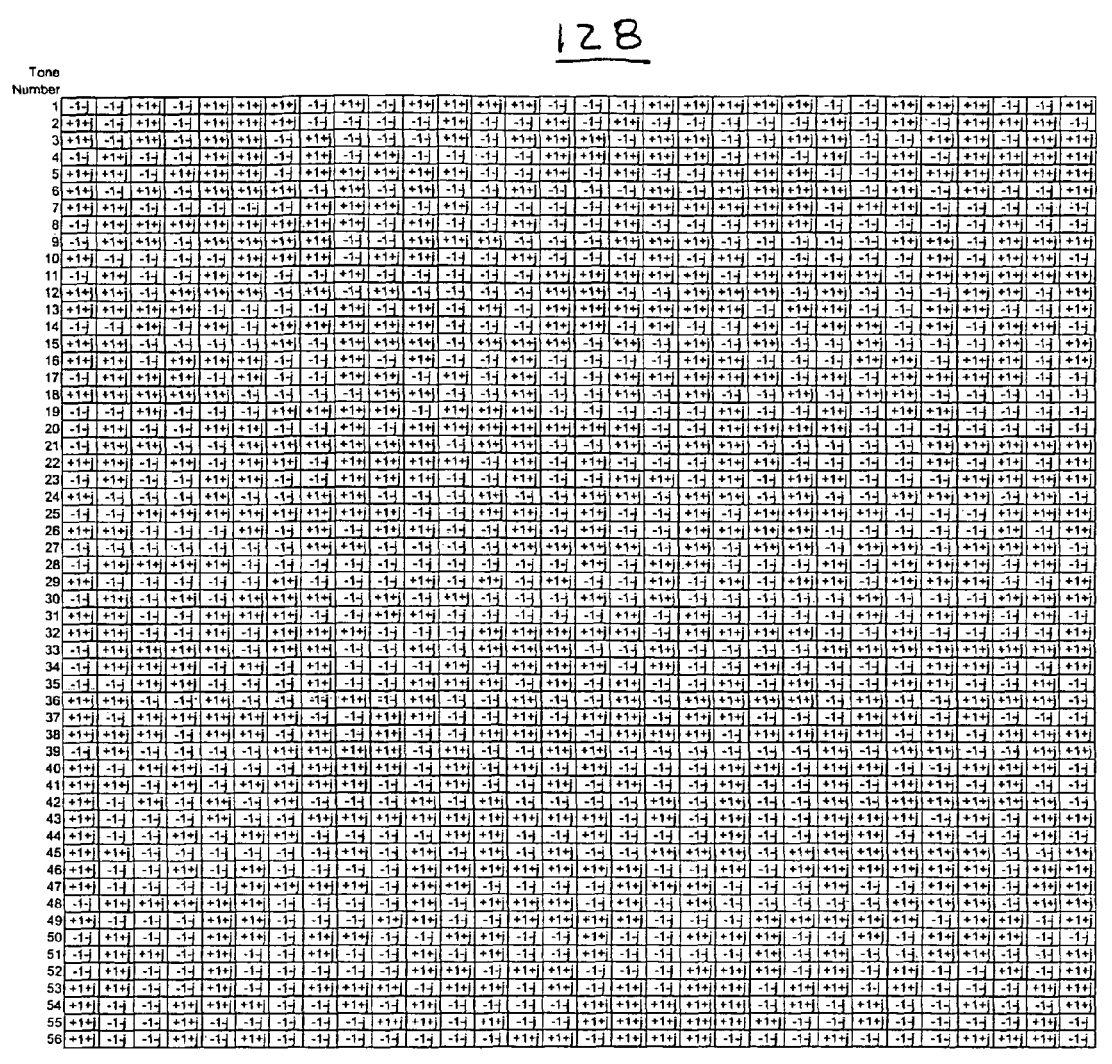

FIG. 7 illustrates a table 128, analogous to the tables shown in FIGS. 4, 5, and 6. The table 128 lists thirty conjugate symmetric sequences, any of which is usable to form the channel estimation sequence. The different ones of the sequences are listed in different columns of the table. Again, analogous to the table 118 shown in FIG. 5, the sequences each define a real-valued signal, and only the positive tones and frequency are shown in the figure. That is to say, 56 tones are shown in each column. Negative tones in frequency are conjugates of the corresponding positive tones and frequency.

FIG. 8 illustrates a sequence 132 that also forms a channel estimation sequence of an embodiment of the present invention. Analogous to the sequences shown in the tables of FIGS. 4 and 5, the sequence is formed of 122 tones, the values of which are sent on different subcarriers defined in the OFDM communication system. The sequence exhibits a peak-to-average ratio of 3.437 dB, measured with oversampling.

FIG. 9 illustrates another sequence 134 that forms a channel estimation sequence of another embodiment of the present invention. Here, the sequence forms a conjugate symmetric channel estimation sequence of which positive frequency tones are shown. Negative frequency tones are conjugates of those that are shown. The sequence exhibits a peak-to-average ratio of 5.75 dB measured with oversampling.

FIG. 10 illustrates a table 138 of sequences, any of which is usable as a channel estimation sequence. Listed together with the sequences are the peak-to-average ratios exhibited by the separate sequences.

Figure 11:
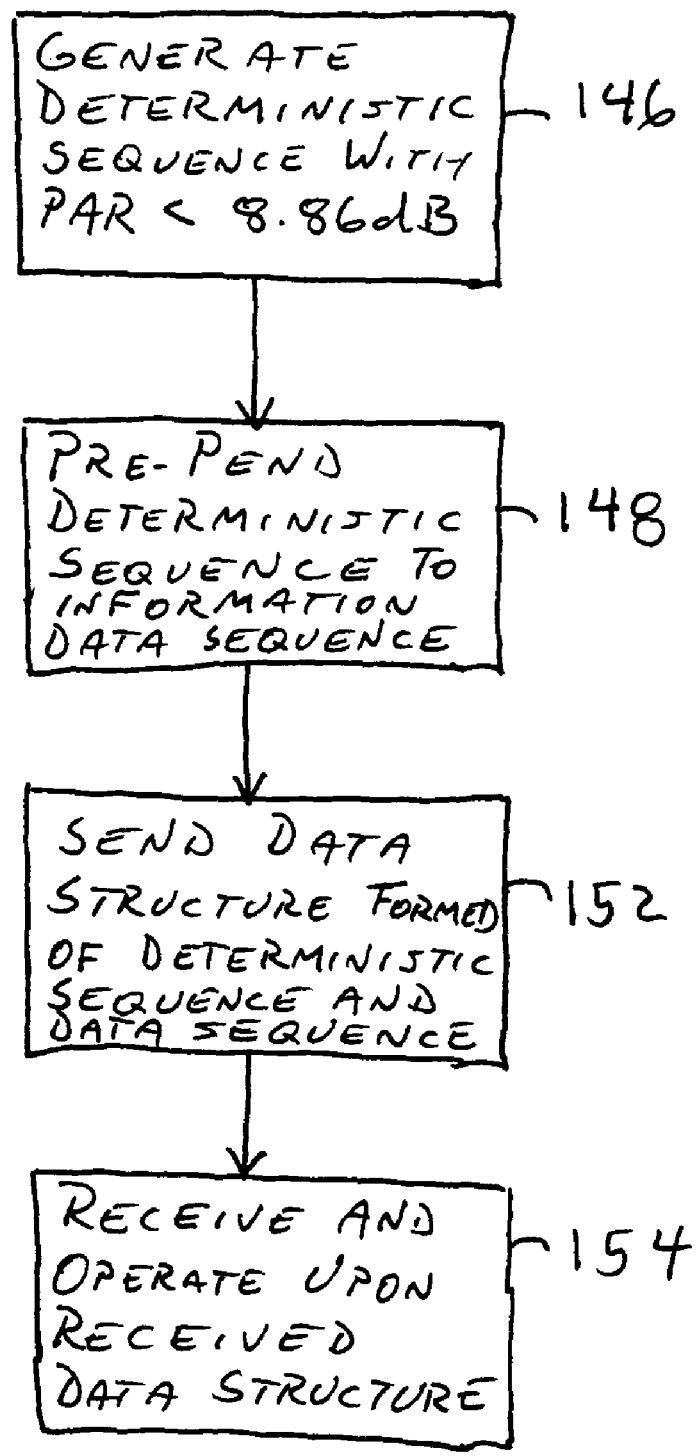
FIG. 11 illustrates a method flow diagram listing the method of operation of an embodiment of the present invention.

FIG. 11 illustrates a method, shown generally at 144 of operation of an embodiment of the present invention. The method facilitates communication of an information data sequence by a communication station.

First, and as an indicated by the block 146, a deterministic sequence of a selected sequence link is generated. The deterministic sequence exhibits a peak-to-average ratio of less than 8.86 dB.

Then, and as indicated by the block 148, the deterministic sequence is pre-pended to the information data sequence. And, as indicated by the block 152, the information data sequence is communicated upon a radio air interface.

Thereafter, and as indicated by the block 154, a receiving station detects the communicated data, and the deterministic sequence is used by the receiving station to facilitate recovery of the informational content of the information data sequence.

Because the sequence exhibits an improved peak-to-average ratio relative to conventionally-formed sequences, the possibility that values of the sequence shall be clipped by communication system circuitry is reduced. Improved communication operations are possible.

The previous descriptions are of preferred examples for implementing the invention, and the scope of the invention should not necessarily be limited by this description. The scope of the present invention is defined by the following claims.

I claim:

1. Apparatus operable to communicate an information data sequence, said apparatus comprising:
a deterministic sequence generator adapted to generate a deterministic non-Golay sequence to be pre-pended to the information data sequence, the deterministic non-Golay sequence having a selected sequence length, the deterministic non-Golay sequence having non-zero values in at least two adjacent subcarriers, the deterministic non-Golay sequence exhibiting a peak-to-average ratio less than 8.86 dB, and the deterministic non-Golay sequence comprising a first sequence part and a second sequence part, wherein tones of the first sequence part are complex conjugates of tones of the second sequence part.

2. The apparatus of claim 1 wherein the deterministic non-Golay sequence generated by said deterministic sequence generator forms a channel estimation sequence.

3. The apparatus of claim 2 further comprising a formatter for forming a data packet, the data packet including a preamble part and a payload part, the information data sequence inserted into the payload part and the deterministic non-Golay sequence inserted into the preamble part.

4. The apparatus of claim 3 wherein the deterministic non-Golay sequence forms a real-valued signal.

5. The apparatus of claim 1 wherein the peak-to-average ratio exhibited by the deterministic non-Golay sequence is at least as low as approximately 5.75 dB.

6. The apparatus of claim 1 wherein the peak-to-average ratio exhibited by the deterministic non-Golay sequence generated by said deterministic sequence generator is at least as low as approximately 3.437 dB.

7. The apparatus of claim 1 wherein the selected length of the deterministic non-Golay sequence comprises a 122 symbol length.

8. The apparatus of claim 1 wherein the selected length of the deterministic non-Golay sequence generated by the deterministic sequence generator comprises a 112 symbol length.

9. The apparatus of claim 1 wherein said deterministic sequence generator comprises a memory location, wherein values of the deterministic non-Golay sequence are stored at the memory location and wherein said sequence generator generates the deterministic non-Golay sequence by retrieving the values thereof stored at the memory location.

10. The apparatus of claim 1 wherein the communication station operates in a multi-channel communication system and wherein portions of the information data sequence and the deterministic non-Golay sequence generated by said deterministic sequence generator prepended thereto are transmitted on separate channels of the multi-channel communication system.

11. The apparatus of claim 10 wherein the multi-channel communication system comprises an OFDM orthogonal frequency division multiplexing communication system that defines a selected plurality of subcarriers and wherein the portions of the information data sequence and the deterministic non-Golay sequence prepended thereto are transmitted on separate subcarriers defined in the OFDM communication system.

12. The apparatus of claim 11 wherein the selected plurality of the subcarriers defined in the OFDM communication system at least corresponds in number to the selected length of the deterministic non-Golay sequence generated by said deterministic sequence generator.

13. The apparatus of claim 1, wherein the deterministic non-Golay sequences comprises 122 or 112 tones and each of the first sequence part and the second sequence part comprises 61 or 56 tones.

14. A method for facilitating communication of an information data sequence, said method comprising:
generating a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, and the deterministic non-Golay sequence comprising a first sequence part and a second sequence part, wherein tones of the first sequence part are complex conjugates of tones of the second sequence part;
pre-pending the deterministic non-Golay sequence generated during said operation of generating to the information data sequence; and
communicating the information data sequence to which the deterministic non-Golay sequence is pre-pended during said operation of pre-pending.

15. The method of claim 14 wherein the communication station operates in a multi-channel communication system, channels of the multi-channel communication system of a number at least as great as the selected length of the deterministic non-Golay sequence generated during said operation of generating.

16. The method of claim 15 wherein the multi-channel communication system comprises an OFDM orthogonal frequency division multiplexing communication system that defines a selected number of subcarriers and wherein said operation of communicating comprises sending portions of the information data sequence to which the deterministic non-Golay sequence is pre-pended upon different ones of the selected number of the subcarriers.

17. The method of claim 14 wherein the deterministic non-Golay sequence generated during said operation of generating is formed by oversampling a tone at a sampling rate greater than a Nyquist rate.

18. The method of claim 14 wherein the selected length of the deterministic non-Golay sequence generated during said operation of generating comprises a 122 symbol length.

19. The method of claim 14 wherein the selected length of the deterministic non-Golay sequence generated during said operation of generating comprises a 112 symbol length.

20. An apparatus operable to communicate an information data sequence, the apparatus comprising:
means for generating a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, and the deterministic non-Golay sequence comprising a first sequence part and a second sequence part, wherein tones of the first sequence part are complex conjugates of tones of the second sequence part;
means for pre-pending the deterministic non-Golay sequence generated during said operation of generating to the information data sequence; and means for communicating the information data sequence to which the deterministic non-Golay sequence is pre-pended during said operation of pre-pending.

21. A non-transitory computer-readable medium having instructions stored therein that when executed causes processing circuitry to:
generate a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, and the deterministic non-Golay sequence comprising a first sequence part and a second sequence part, wherein tones of the first sequence part are complex conjugates of tones of the second sequence part;
pre-pend the deterministic non-Golay sequence generated during said operation of generating to the information data sequence; and
communicate the information data sequence to which the deterministic non-Golay sequence is pre-pended during said operation of pre-pending.

22. A communication station comprising:
a deterministic sequence generator adapted to generate a deterministic non-Golay sequence to be pre-pended to the information data sequence, the deterministic non-Golay sequence having a selected sequence length, the deterministic non-Golay sequence having non-zero values in at least two adjacent subcarriers, the deterministic non-Golay sequence exhibiting a peak-to-average ratio less than 8.86 dB, and the deterministic non-Golay sequence comprising a first sequence part and a second sequence part, wherein tones of the first sequence part are complex conjugates of tones of the second sequence part; and
an antenna configured to transmit the deterministic non-Golay sequence.

23. A communication station comprising:
an antenna configured to receive a deterministic non-Golay sequence pre-pended to an information data sequence; and
a channel estimator adapted to operate upon the deterministic non-Golay sequence, the deterministic non-Golay sequence having a selected sequence length, the deterministic non-Golay sequence having non-zero values in at least two adjacent subcarriers, the deterministic non-Golay sequence exhibiting a peak-to-average ratio less than 8.86 dB, and the deterministic non-Golay sequence comprising a first sequence part and a second sequence part, wherein tones of the first sequence part are complex conjugates of tones of the second sequence part.

24. A method for facilitating communication of an information data sequence, said method comprising:
receiving a deterministic non-Golay sequence of a selected sequence length, the deterministic non-Golay sequence exhibiting a peak-to-average ratio of less than 8.86 dB, and wherein the deterministic non-Golay sequence is pre-pended to the information data sequence, the deterministic non-Golay sequence having non-zero values in at least two adjacent subcarriers, and the deterministic non-Golay sequence comprising a first sequence part and a second sequence part, wherein tones of the first sequence part are complex conjugates of tones of the second sequence part;
estimating a channel using the received deterministic non-Golay sequence to form a channel estimate; and
demodulating the information data sequence based on the channel estimate.

25. An apparatus operable to communicate an information data sequence comprising:
a channel estimator adapted to operate upon a deterministic non-Golay sequence, the deterministic non-Golay sequence having a selected sequence length, the deterministic non-Golay sequence having non-zero values in at least two adjacent subcarriers, the deterministic non-Golay sequence exhibiting a peak-to-average ratio less than 8.86 dB, and the deterministic non-Golay sequence comprising a first sequence part and a second sequence part, wherein tones of the first sequence part are complex conjugates of tones of the second sequence part.

26. An apparatus operable to communicate an information data sequence, the apparatus comprising:
means for receiving a deterministic non-Golay sequence of a selected sequence length, the deterministic non-Golay sequence exhibiting a peak-to-average ratio of less than 8.86 dB, and wherein the deterministic non-Golay sequence is pre-pended to the information data sequence, the deterministic non-Golay sequence having non-zero values in at least two adjacent subcarriers, and the deterministic non-Golay sequence comprising a first sequence part and a second sequence part, wherein tones of the first sequence part are complex conjugates of tones of the second sequence part;
means for estimating a channel using the received deterministic non-Golay sequence to form a channel estimate; and
means for demodulating the information data sequence based on the channel estimate.

27. A non-transitory computer-readable medium having instructions stored therein that when executed causes processing circuitry to:
receive a deterministic non-Golay sequence of a selected sequence length, the deterministic non-Golay sequence exhibiting a peak-to-average ratio of less than 8.86 dB, and wherein the deterministic non-Golay sequence is pre-pended to the information data sequence, the deterministic non-Golay sequence having non-zero values in at least two adjacent subcarriers, and the deterministic non-Golay sequence comprising a first sequence part and a second sequence part, wherein tones of the first sequence part are complex conjugates of tones of the second sequence part;
estimate a channel using the received deterministic non-Golay sequence to form a channel estimate; and
demodulate the information data sequence based on the channel estimate.

28. An apparatus operable to communicate an information data sequence, said apparatus comprising:
a deterministic sequence generator adapted to generate a deterministic non-Golay sequence to be pre-pended to the information data sequence, the deterministic non-Golay sequence having a selected sequence length, the deterministic non-Golay sequence having non-zero values in at least two adjacent subcarriers, the deterministic non-Golay sequence exhibiting a peak-to-average ratio less than 8.86 dB, wherein the selected sequence length of the deterministic non-Golay sequence comprises a 122 or 112 symbol length.

29. A method for facilitating communication of an information data sequence, said method comprising:
generating a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, wherein the selected sequence length of the deterministic non-Golay sequence comprises a 122 or 112 symbol length;

pre-pending the deterministic non-Golay sequence generated during said operation of generating to the information data sequence; and communicating the information data sequence to which the deterministic non-Golay sequence is pre-pended during said operation of pre-pending.

30. An apparatus operable to communicate an information data sequence, the apparatus comprising:

means for generating a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, wherein the selected sequence length of the deterministic non-Golay sequence comprises a 122 or 112 symbol length;

means for pre-pending the deterministic non-Golay sequence generated during said operation of generating to the information data sequence; and means for communicating the information data sequence to which the deterministic non-Golay sequence is pre-pended during said operation of pre-pending.

31. A non-transitory computer-readable medium having instructions stored therein that when executed causes processing circuitry to:

generate a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, wherein the selected sequence length of the deterministic non-Golay sequence comprises a 122 or 112 symbol length;

pre-pend the deterministic non-Golay sequence generated during said operation of generating to the information data sequence; and communicate the information data sequence to which the deterministic non-Golay sequence is pre-pended during said operation of pre-pending.

32. A communication station comprising:

a deterministic sequence generator adapted to generate a deterministic non-Golay sequence to be pre-pended to the information data sequence, the deterministic non-Golay sequence having a selected sequence length, the deterministic non-Golay sequence having non-zero values in at least two adjacent subcarriers, the deterministic non-Golay sequence exhibiting a peak-to-average ratio less than 8.86 dB, wherein the selected sequence length of the deterministic non-Golay sequence comprises a 122 or 112 symbol length; and an antenna configured to transmit the deterministic non-Golay sequence.

33. An apparatus operable to communicate an information data sequence, said apparatus comprising:

a deterministic sequence generator adapted to generate a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, the deterministic non-Golay sequence comprising a first sequence part and a second sequence part, wherein tones of the first sequence part are complex conjugates of tones of the second sequence part;

a formatter configured to generate a preamble comprising the deterministic non-Golay sequence, a packet sync sequence and a frame sync sequence and to pre-pend the preamble to the information data sequence; and a communication module configured to communicate the information data sequence to which the preamble is pre-pended during said operation of pre-pending.

34. A method for facilitating communication of an information data sequence, said method comprising:

generating a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, the deterministic non-Golay sequence comprising a first sequence part and a second sequence part, wherein tones of the first sequence part are complex conjugates of tones of the second sequence part;

generating a preamble comprising the deterministic non-Golay sequence, a packet sync sequence and a frame sync sequence;

pre-pending the preamble to the information data sequence; and communicating the information data sequence to which the preamble is pre-pended during said operation of pre-pending.

35. An apparatus operable to communicate an information data sequence, the apparatus comprising:

means for generating a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, the deterministic non-Golay sequence comprising a first sequence part and a second sequence part, wherein tones of the first sequence part are complex conjugates of tones of the second sequence part;

means for generating a preamble comprising the deterministic non-Golay sequence, a packet sync sequence and a frame sync sequence;

means for pre-pending the preamble to the information data sequence; and means for communicating the information data sequence to which the preamble is pre-pended during said operation of pre-pending.

36. A non-transitory computer-readable medium having instructions stored therein that when executed causes processing circuitry to:

generate a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, the deterministic non-Golay sequence comprising a first sequence part and a second sequence part, wherein tones of the first sequence part are complex conjugates of tones of the second sequence part;

generate a preamble comprising the deterministic non-Golay sequence, a packet sync sequence and a frame sync sequence;

pre-pend the preamble to the information data sequence; and communicate the information data sequence to which the preamble is pre-pended during said operation of pre-pending.

37. A communication station comprising:

a deterministic sequence generator adapted to generate a deterministic non-Golay sequence of a selected sequence length, the deterministic non-Golay sequence exhibiting a peak-to-average ratio of less than 8.86 dB, the deterministic non-Golay sequence having non-zero values in at least two adjacent subcarriers, the deterministic non-Golay sequence comprising a first sequence part and a second sequence part, wherein tones of the first sequence part are complex conjugates of tones of the second sequence part;

a formatter configured to generate a preamble comprising the deterministic non-Golay sequence, a packet sync sequence and a frame sync sequence and to pre-pend the preamble to the information data sequence;

a communication module configured to communicate the information data sequence to which the preamble is pre-pended during said operation of pre-pending; and an antenna configured to transmit the information data sequence.

* * * * *